United States Patent [19]

Blasko

[11] Patent Number: 5,206,802
[45] Date of Patent: Apr. 27, 1993

[54] BLANKING INTERVAL VOLTAGE DEVIATION COMPENSATOR FOR INVERTERS AND CONVERTERS

[75] Inventor: Vladimir Blasko, Newington, Conn.

[73] Assignee: Otis Elevator Company, Farmington, Conn.

[21] Appl. No.: 761,113

[22] Filed: Sep. 17, 1991

[51] Int. Cl.⁵ .......................................... H02M 7/537
[52] U.S. Cl. ...................................... 363/41; 363/98; 318/811
[58] Field of Search ...................... 363/41, 98; 318/811

[56] References Cited

U.S. PATENT DOCUMENTS

| | | | |
|---|---|---|---|
| 4,547,719 | 10/1985 | Seki | 318/723 |
| 4,562,386 | 12/1985 | Goff et al. | 318/254 |
| 4,692,854 | 9/1987 | Baxter, Jr. et al. | 363/75 |
| 4,719,400 | 1/1988 | Sakamoto | 318/811 |
| 4,969,079 | 11/1990 | Kirayama | 363/41 |
| 4,978,894 | 12/1990 | Takahara | 318/768 |
| 5,060,129 | 10/1991 | Maruyama | 363/41 |
| 5,091,842 | 2/1992 | Kawai | 363/98 |
| 5,099,408 | 3/1992 | Chen et al. | 363/41 |
| 5,107,438 | 4/1992 | Sato | 364/483 |
| 5,115,386 | 5/1992 | Shirahama et al. | 363/41 |
| 5,153,821 | 10/1992 | Blasko | 363/41 |

OTHER PUBLICATIONS

"Power Electronics Converters, Applications, and Design" John Wiley & Sons, New York, 1989, pp. 141-144.

Primary Examiner—Steven L. Stephan
Assistant Examiner—Ben M. Davidson
Attorney, Agent, or Firm—Breffni X. Baggot

[57] ABSTRACT

The invention is used in a voltage conversion bridge for use in converting an AC voltage to a DC voltage or inverting a DC voltage into an AC voltage. In a three-phase bridge having one of three reference phase voltages $U_A$ or $U_B$ or $U_C$ associated with each leg, one of the switches S1, S2 or S3 (or alternatively their complements S1*, S2* or S3*) conducts in the time intervals where the associated voltage $U_A$, $U_B$ or $U_C$ has a higher (or alternatively, smaller) amplitude than the other two reference voltages, and during these times the blanking interval compensation loss is compensated. According to the invention, (a) a three reference voltages are supplied; (b) the maximum of these voltages is detected; (c) the maximum is subtracted f the peak value of a triangle wave used for forming difference; (d) the difference is added to each of reference voltages to form a three first augmented reference voltages to a blanking interval loss compensator; (e) if the voltage conversion bridge is not saturated and adding a blanking interval deviation voltage compensation signal would not cause saturation, a blanking interval voltage deviation compensation signal is added to the first augmented reference voltages to compensate for voltage deviation caused by a blanking interval, thereby providing second augmented reference signals; and (f) the compensated signals are supplied to the PWM section, which in turn supplies PWM signals to a three-phase bridge. This method minimizes voltage deviations caused by the use of a blanking interval.

6 Claims, 6 Drawing Sheets

BLANKING INTERVAL VOLTAGE DEVIATION COMPENSATOR FOR INVERTERS AND CONVERTERS

TECHNICAL FIELD

This invention relates to pulse-width-modulated (PWM) inverters and converters and particularly to the effect of blanking time interval on output voltage of those inverters and converters.

BACKGROUND OF THE INVENTION

In PWM inverters and converters, the phase voltage is composed of a series of square pulses of short duration compared to the fundamental frequency. These pulses are of constant magnitude and variable pulse widths.

The output voltage waveform of an inverter is a pulse train whose polarity reverses periodically to provide the fundamental frequency. The repetition rate of the output pulse train is the carrier frequency $f_c$, if a triangle comparison PWM method is used. Variation of the width of the pulses that make up each half period controls the RMS voltage magnitude. This variation or modulation is achieved in practice by many techniques. A common technique is known as the triangulation or subharmonic method in which the duration of pulses that control switches in power circuit is determined by the crossover points of two reference signals: a high-frequency triangular voltage wave and a sinusoidal voltage varying at fundamental frequency. The PWM signal is used to control the switches in a bridge at $f_c$.

Ideally, the transistors in each leg of the bridge circuit instantaneously turn off when the PWM signal changes to its inactive state, for example, changes from logic 1 to logic 0. However, in practical circuits utilizing transistor-type circuits, instantaneous turnoff of the transistors is not realizable. For example, when a PWM signal supplied to a pair of switches in a bridge leg changes from logic 1 to logic 0, the first transistor does not turn fully off before the second turns on. This is because a finite amount of time is required for a transistor to come out of saturation after the PWM drive signal changes to its inactive state (logic 0). This results in simultaneous conduction of the two transistors in the bridge leg. Since the two transistors form a series connection across the power supply, their simultaneous conduction results in excessive current and the destruction of the transistors. To avoid this problem, an intentional blanking interval is introduced into the PWM signal driving the bridge circuit. In other words, the turn-on of the second switch in the inverter leg is delayed by a blanking time $t_\Delta$, to avoid a short circuit through the inverter leg. The duration of the time delay $t_\Delta$ is sufficient to ensure that both transistors in the inverter leg are off before allowing a transistor in the pair in the bridge circuit to turn on. The blanking interval time is also known as the dead time.

Since both the switches are off during the blanking time, the line-to-neutral voltage during that time interval depends on the direction of the load current. When a load current $i_A$ is positive (going from inverter to load), this results in a voltage loss $\Delta U_A = U_{DC}*[t_\Delta/T_C]$ and when the current is negative, in a voltage gain $\Delta U_A = U_{DC}*[-t_\Delta/T_C]$, where $t_\Delta$ is equal to the blanking time interval, $T_C$ is equal to the period of the carrier frequency and $U_{DC}$ is the DC buss voltage. It is desirable to minimize $\Delta U_A$.

Assuming a three-phase, three-legged power conversion bridge (converter or inverter), the same analysis applies to the second leg B and third leg C. The distortion in $U_A$, $U_B$, and $U_C$ at zero crossings of phase currents in $i_A$, $i_B$, and $i_C$ results in harmonics, such as third, fifth, seventh, and so on of the fundamental frequency in the inverter or converter output.

The need for compensation of a blanking time interval is well known (see U.S. Pat. No. 4,562,386 by Goff et al, filed Jan. 26, 1984, issued Dec. 31, 1985 and entitled "Current Sense Demodulator"), as are the problems with harmonics caused by the blanking interval which have also long been recognized (Ned Mohan, Tore M. Underland, William P. Robbins, "Power Electronics Converters, Applications, and Design", John Wiley & Sons, New York, 1989, pp 141-144).

One method of compensating for blanking interval loss is disclosed in U.S. Pat. No. 4,547,719, filed Jan. 25, 1983 and issued Oct. 15, 1985 to Sakamoto et al. which relies upon voltage feedback. This arrangement employs a voltage converting circuit for generating an impressed voltage from an armature voltage $U_C$, a subtracting circuit for calculating the difference between the output voltage of a holding circuit and the output voltage of the voltage converting circuit, and an integrating circuit for integrating the difference generated by the subtracting circuit. In other words, the output voltage of the inverter circuit is fed back to a pre-stage of the PWM circuit to raise the gain using the feedback loop. However, with an arrangement in which a microprocessor is used as a portion of the motor control circuit, it is necessary to provide separate analog circuits for these feedback loops. This process must be implemented by fast analog circuits and cannot be performed quickly enough by the microprocessor. The solution is complicated in construction and carried out at high cost.

A second apparatus for compensating for PWM blanking time is disclosed in U.S Pat. No. 4,719,400 filed Oct. 19, 1983 and issued on Jan. 12, 1988 to Kurakake et al. Kurakake discloses a motor control apparatus including an arithmetic circuit for calculating the current command, a holding circuit for holding the current command, a PWM circuit for pulse-width-modulating an output signal from the holding circuit and provided with a dead zone with respect to the output signal, and a transistorized amplifier circuit for controlling a motor by a PWM signal. The arithmetic circuit adds a compensating signal to the current command to compensate for motor control losses due to the blanking time and delivers the result to the holding circuit. This discloses a solution to the problem of losses and distortion that result from the blanking time, but creates another problem in that the compensation is performed all the time. For example, when the PWM circuit is commanded to be near saturation (full conduction of the complementary switches in a power circuit), an additional compensating signal may bring the PWM circuit into saturation and provide excessive load voltage. On the other hand, when the PWM circuit is commanded to go into saturation by the reference voltage, a blanking interval voltage deviation signal can bring it out of saturation, thereby unintentionally reducing the load voltage. In sum, compensation performed all the time causes additional load current distortion when the PWM circuit operates near saturation.

DISCLOSURE OF THE INVENTION

The invention is used in a voltage conversion bridge for use in converting an AC voltage to a DC voltage or inverting a DC voltage into an AC voltage. In a three-phase bridge having one of three reference phase voltages $U_A$, $U_B$, $U_C$ associated with each leg, one of the switches S1, S2 or S3 (or alternatively their complements S1*, S2* or S3*) conducts in the time intervals where the associated voltage $U_A$, $U_B$ or $U_C$ has a higher (or alternatively, smaller) amplitude than the other two reference voltages, and during these times the blanking interval compensation loss is compensated. According to the invention, (a) three reference voltages are supplied; (b) the maximum of these voltages is detected; (c) the maximum is subtracted from the peak value of a triangle wave for forming a difference; (d) the difference is added to each of the reference voltages to provide a three first augmented reference voltages to a blanking interval loss compensator; (e) if the voltage conversion bridge is not saturated and adding a blanking interval deviation voltage compensation signal would not cause saturation, a blanking interval voltage deviation compensation signal is added to the first augmented reference voltages to compensate for voltage deviation caused by a blanking interval, thereby providing second augmented reference voltage signals; and (f) the compensated signals are supplied to the PWM section, which in turn supplies PWM signals to a three-phase bridge. This method minimizes voltage deviations caused by the use of a blanking interval.

For a three-phase power conversion bridge, the result of steps (a), (b), (c), (d), and (f) is that when one of the three reference voltages is greater than the other two, a switch in one of the three complementary pairs of switches in the bridge conducts, while in each of the other two complementary pairs both switches open and close in response to the PWM signal such that only two currents are independently controlled by each of the two complementary pairs which are allowed to open and close, and the third current, associated with the complementary pair which is not allowed to switch, is controlled by the other two. Keeping one switch in each leg closed for one-third of the period of the reference voltage allows control of all three load currents to be dictated by the switching in only two legs of the bridge. The inclusion of step (e) provides that voltage deviations caused by the use of a blanking interval are minimized for the two legs that are not in continuous conduction. For an inverter, the deviations are in the locally averaged AC output voltage. For a converter, the deviations are in the locally averaged AC input voltage.

The first object of the invention is to compensate for a PWM inverter output voltage deviation caused by a blanking interval by adding a voltage, equal to the deviation but with the opposite polarity, to the PWM input.

A second object is to compensate for a PWM inverter output voltage deviation caused by a blanking interval by adding a voltage, equal to the deviation but with the opposite polarity, to the PWM input but only when the PWM circuit is not saturated and the addition would not saturate the PWM circuit.

The third object is to compensate for a PWM inverter output voltage deviation caused by a blanking interval by adding a voltage, equal to the deviation, to the PWM input but only when the PWM circuit is not saturated and the addition would not saturate the PWM circuit, where each leg of the PWM inverter takes a turn at being in continuous conduction for one third of the switching cycle of the input reference voltage.

BRIEF DESCRIPTION OF THE DRAWINGS

FIG. 1, including

FIGS. 2 and 3 are on a common time line and $m_A < 1$;

FIG. 5, including

DETAILED DESCRIPTION OF THE INVENTION

Figure 1A:
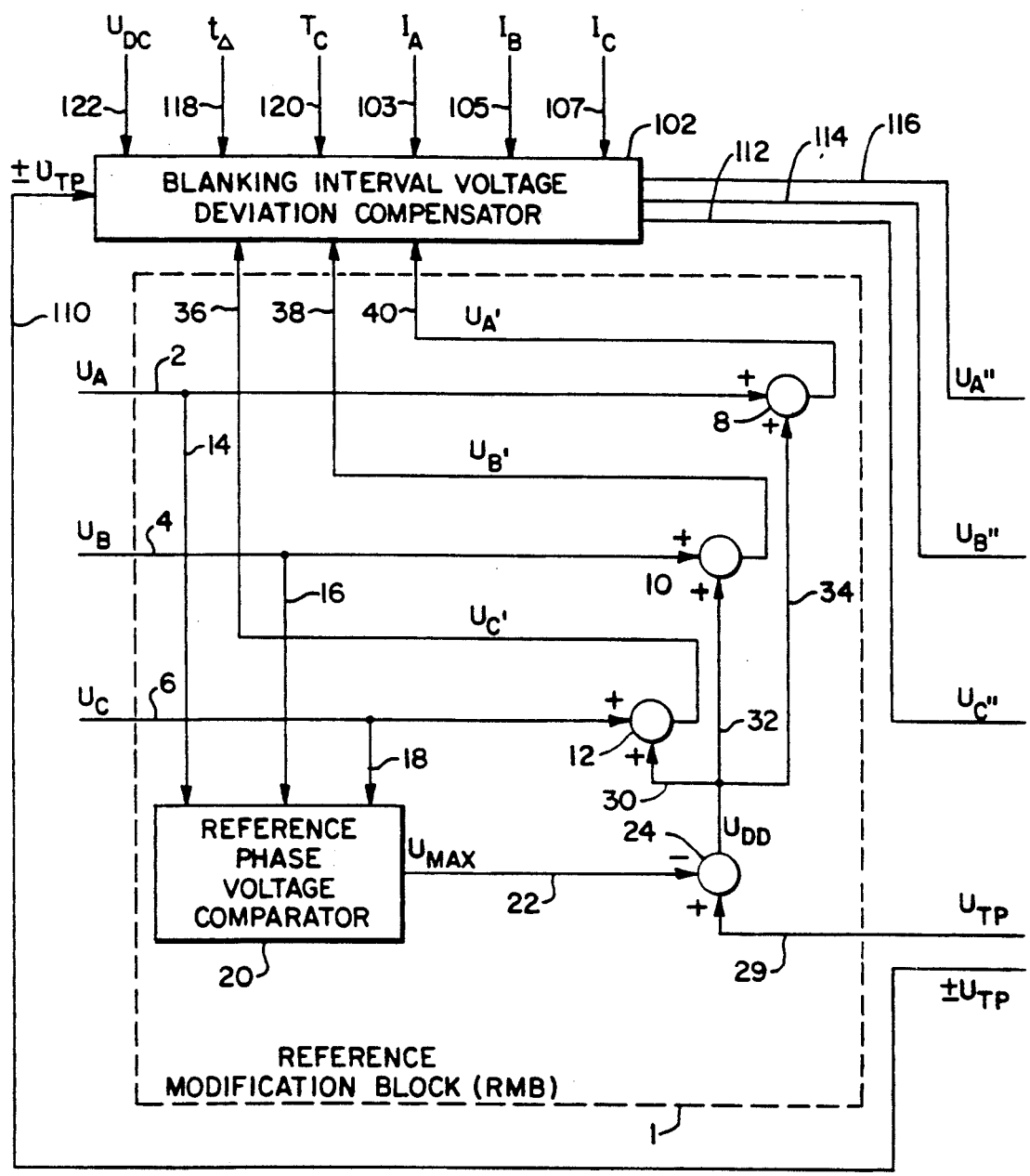
FIGS. 1A and 1B, shows a block diagram implementing the present invention in an inverter.
Figure 1B:
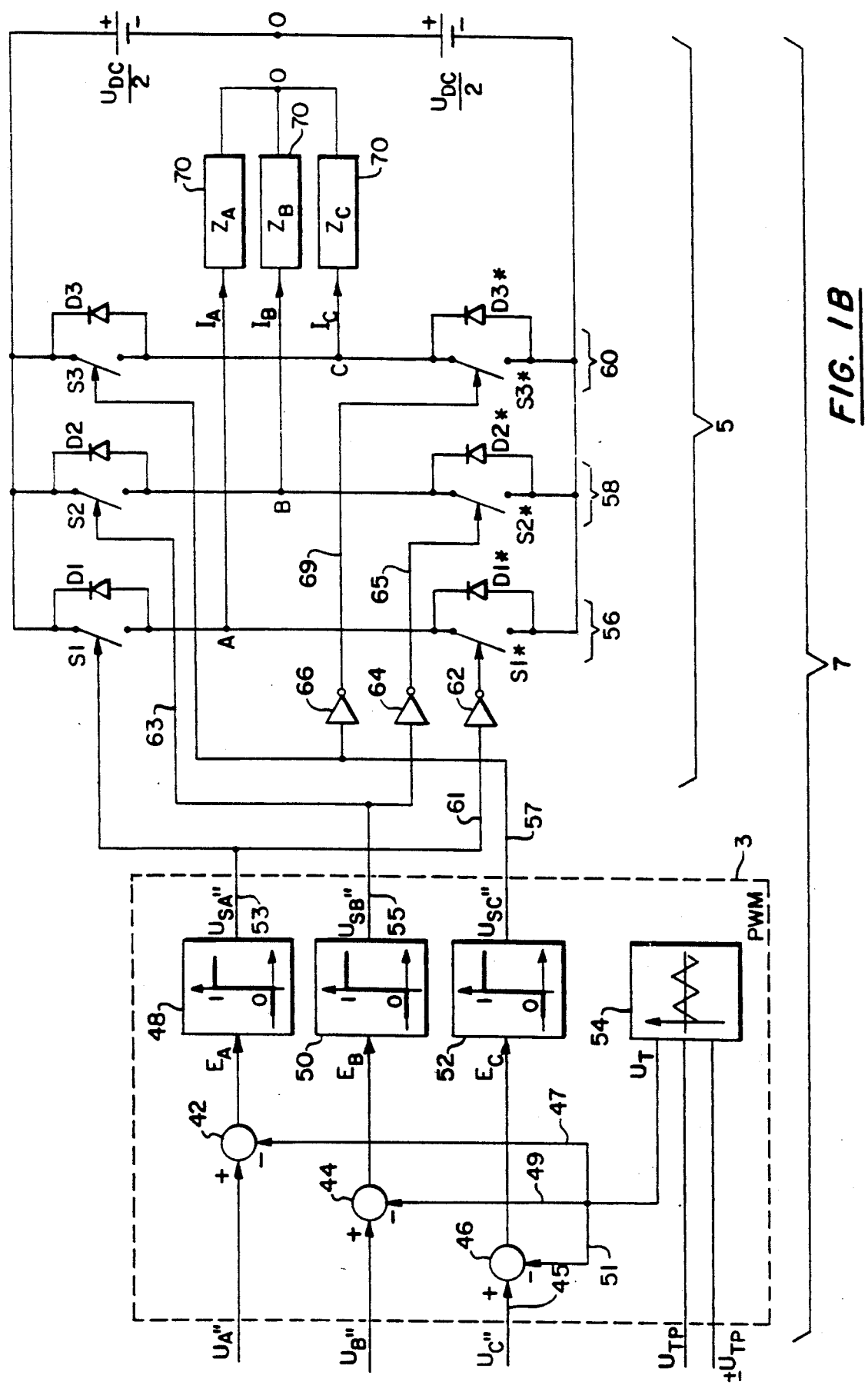
Figure 5A:
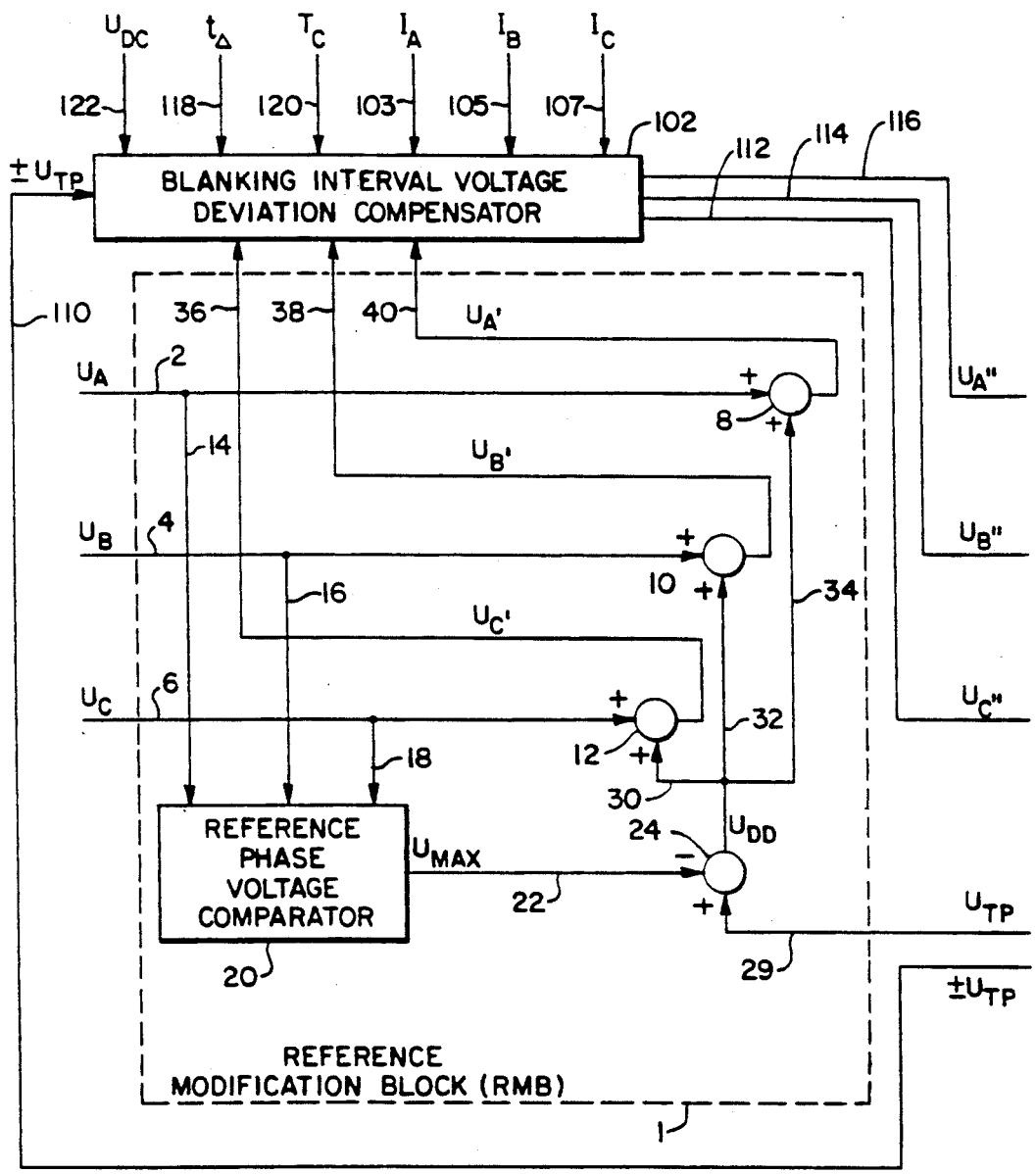
FIGS. 5A and 5B, shows a circuit for implementing the invention in a converter.
Figure 5B:
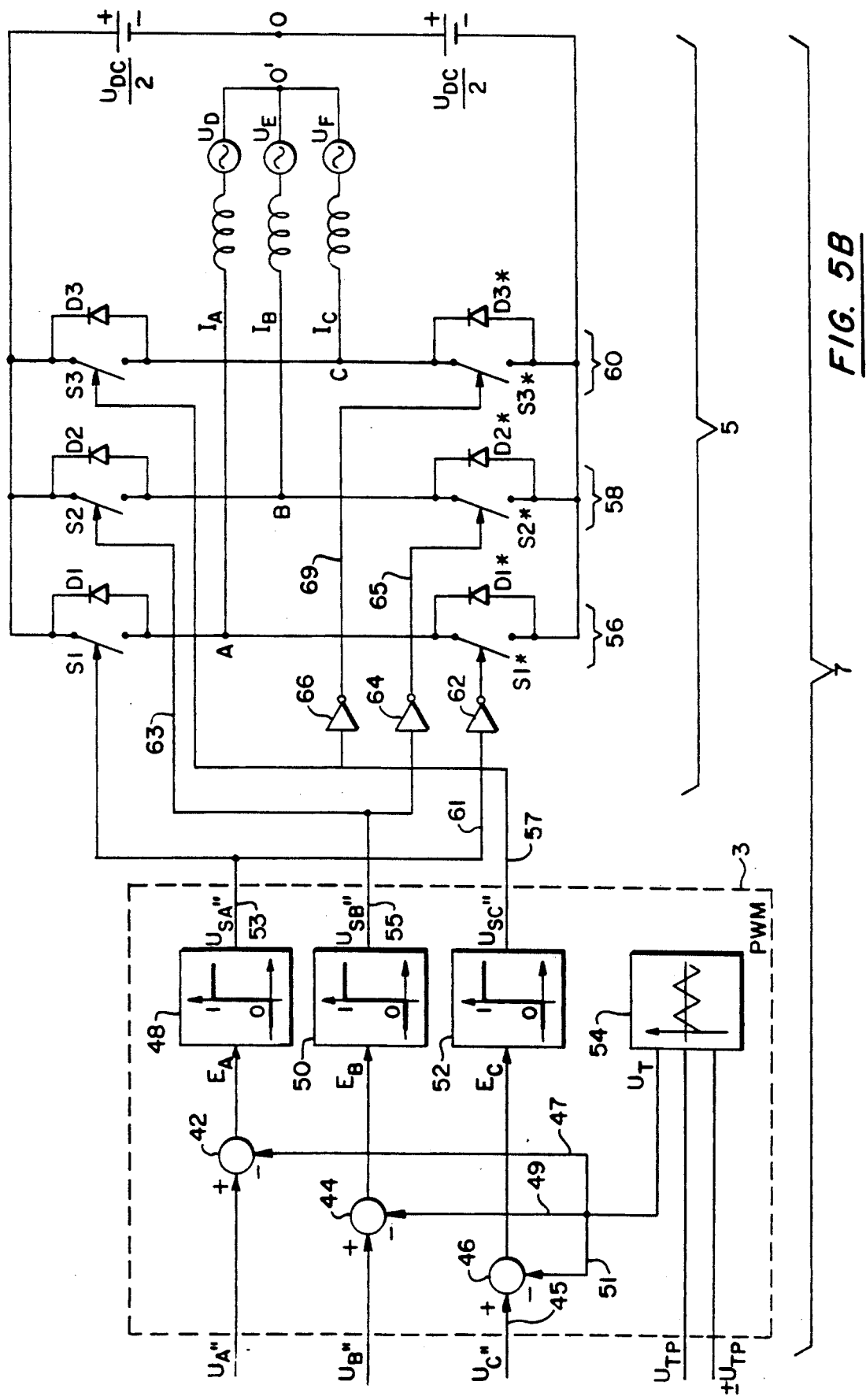

FIG. 1 shows a block diagram for implementing the invention in an inverter. It consists of a reference modification block (RMB) 1, a PWM block 3, and a semiconductor bridge 5. The bridge 5 may be for inversion (FIG. 1), DC to AC, or conversion (FIG. 5), AC to DC. For an inverter, the invention compensates voltage deviation in the inverter output. For a converter, the invention compensates voltage deviation in the AC converter input. PWM 3 and bridge 5 together comprise a power conversion circuit 7. RMB 1 is responsive on lines 2, 4, 6 to three sinusoidal reference voltages $U_A$ $U_B$ $U_C$, a triangle voltage $U_T$, and produces three first augmented reference voltages ($U_A'$, $U_B'$, and $U_C'$) on lines 36, 38, 40. $U_A$ and $U_B$ and $U_C$ are command reference signals; DC power is obtained from two DC voltage sources $U_{DC}/2$. The three reference voltages ($U_A$ and $U_B$ and $U_C$) are spaced 120° apart from one another. The first augmented reference voltages ($U_A'$ and $U_B'$ and $U_C'$) are 120° apart. RMB 1 consists of three summers 8, 10, and 12, a reference voltage comparator 20, and fourth summer 24 responsive to the magnitude of a triangle peak $U_{TP}$ of the carrier signal $U_T$. The magnitude of the carrier signal has a positive peak $U_{TP}$, and a negative peak $-UT_{TP}$. The three reference voltages ($U_A$ and $U_B$ and $U_C$) are provided on lines 2, 4, 6 to RMB 1 and to summers 8, 10, 12. In a reference voltage comparator 20, the magnitudes of each voltage ($U_A$ and $U_B$ and $U_C$) are compared and the greatest, $U_{MAX}$, is produced on a line 22 to a summer 24. The reference voltage comparator 20 compares two of the reference voltages and then compares the greater of these two to a third reference voltage to provide $U_{MAX}$.

In FIG. 1, a constant voltage triangle peak value $U_{TP}$ of triangle signal $U_T$ is produced in the PWM 3 and provided on line 29 to the summer 24. In the summer 24, the greatest voltage, $U_{MAX}$, is subtracted from the triangle peak signal $U_{TP}$ on line 29 and the difference $U_{DD}$ provided on lines 30, 32, 34 to summers 8, 10, 12. At the summers 8, 10, 12, the difference signal $U_{DD}$ is added to each of the reference voltage signals ($U_A$ and $U_B$ and $U_C$), thus providing first augmented reference voltage signals ($U_A'$ and $U_B'$ and $U_C'$) which are supplied to a blanking interval voltage deviation compensator 102 over lines 36, 38, and 40. In FIG. 1, a PWM 3 contains three summers 42, 44, 46, three comparators 48, 50, 52, and a triangle signal generator 54. Each of the summers 42, 44, and 46 is responsive to second augmented reference voltage signals ($U_A''$ and $U_B''$ and $U_C''$) on lines 112, 114, 116 and the triangle signal $U_T$ provided by the triangle signal generator 54 onto lines 47, 49, 51. The triangle signal generator 54 also provides $+U_{TP}$ on line 29. The triangle signal $U_T$ has peaks of $+U_{TP}$ and $-U_{TP}$. The summers 42, 44, 46 provide error signals ($E_A$ and $E_B$ and $E_C$) to the comparators 48, 50, 52. If $E_A$, $E_B$ or $E_C$ is greater than zero (i.e., $U_X''$ is greater than $U_T$), the output of the associated comparator 48, 50, or 52 assumes a value $U_{SX}'' = 1$, where X is A, B, and C for comparators 48, 50, 52. Thus, the comparators 48, 50, 52 produce switch signals ($U_{SA}''$ and $U_{SB}''$ and $U_{SC}''$) on lines 53, 55, 57 and provide them to the bridge 5. The bridge 5 includes three legs 56, 58, 60.

In FIG. 1, each leg includes two complementary semiconductor switch assemblies. The first leg includes a switch S1, a freewheeling diode D1 shunting that switch, and a complementary switching assembly—a NOT gate 62, a switch S1*, and a freewheeling diode D1* shunting that switch. The second leg 58 includes a switch S2, a freewheeling diode D2* shunting that switch, and a complementary switching assembly—a switch S2*, a NOT gate 64, and a freewheeling diode D2 shunting that switch. The third leg 60 includes a switch S3, a freewheeling diode D3 shunting that switch, and a complementary switching assembly—a switch S3*, a NOT gate 66, and a freewheeling diode D3* shunting that switch.

The first, second, and third legs 56, 58, 60 of the bridge 5 are responsive to the switch signals ($U_{SA}''$ and $U_{SB}''$ and $U_{SC}''$) provided on lines 53, 55, 57. For example, if $E_A$ is greater than zero, i.e., $U_A''$ is greater than $U_T$, the output of comparator 48 assumes a value $U_{SA}'' = 1$. Switch S1 is closed and S1* is opened.

Figure 2:
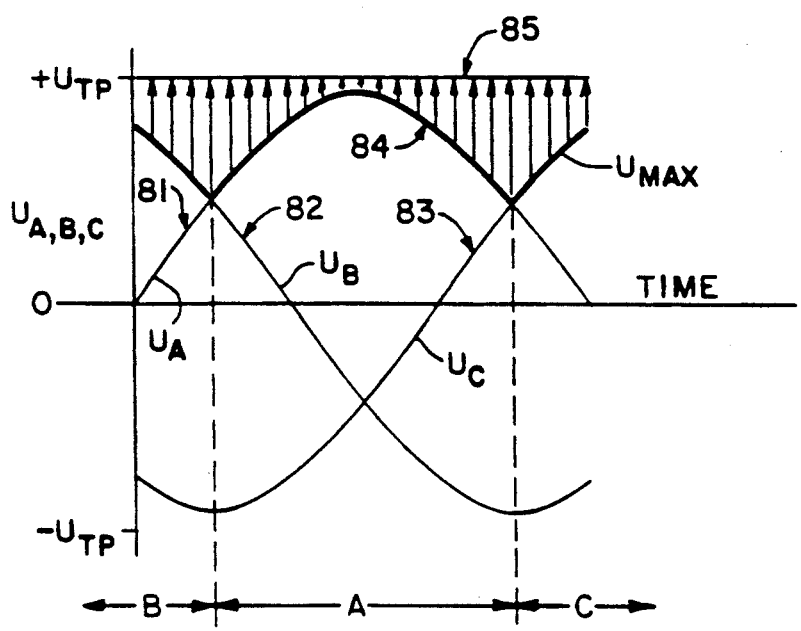
FIG. 2 is a voltage v. time graph of a three-phase sinusoidal voltage, $U_{ABC}$ wherein the amplitude modulation index $m_A < 1$.
Figure 3:
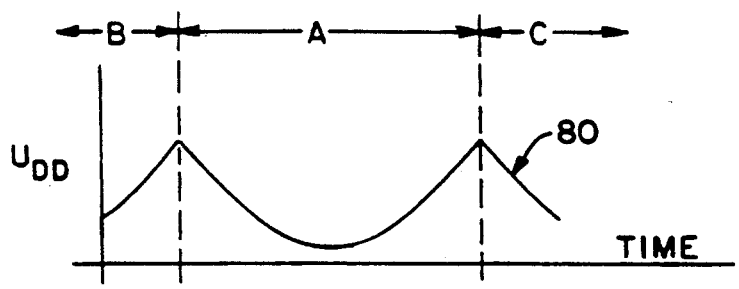
FIG. 3 is a voltage v. time graph of a difference signal, $U_{DD}$.

An amplitude modulation index $m_A$ is defined as a ratio of the peak value of a sinusoidal reference voltage to the peak value $U_{TP}$. For $m_A < 1$, $U_A$ and $U_B$ and $U_C$, as waveforms 81, 82, 83, are shown in FIG. 2. The uppermost portion of waveforms 81, 82, 83, the maximum of $U_A$ and $U_B$ and $U_C$, is shown in bold as waveform 84, $U_{MAX}$. The triangle peak signal $U_{TP}$ is marked on the voltage axis. FIGS. 2 and 3 are on a common time line and are divided into three sections "A", "B", "C".

The difference signal ($U_{DD}$) produced on line 24 by the summer 24 and equal to the difference between $U_{TP}$ and $U_{MAX}$ is shown by a waveform 80 in FIG. 3. $U_{DD}$ causes Uo'o to vary. Uo'o is the potential difference between the load midpoint, O', and the supply midpoint, O.

The microprocessor-based blanking interval voltage deviation compensator 102 is responsive on lines 36, 38, 40 to the first augmented reference voltage $U_X'$ (where X is A, B, or C) and on lines 103, 105, 107 to reference currents $I_A$ $I_B$ $I_C$ associated with those reference voltages and to the triangle peak signals $\pm U_{TP}$ on line 110. It provides on lines 112, 114, 116 three second augmented reference voltage signals ($U_A''$ and $U_B''$ and $U_C''$) for each of the bridge legs 56, 58, 60. $t_\Delta$, $T_C$ and $U_{DC}$ on lines 118, 120, 122, (the blanking interval, the carrier time period, and DC buss voltage, respectively) are also provided to the blanking interval voltage deviation compensator 102 for providing a blanking interval voltage compensation voltage $\Delta U_X$.

Figure 4:
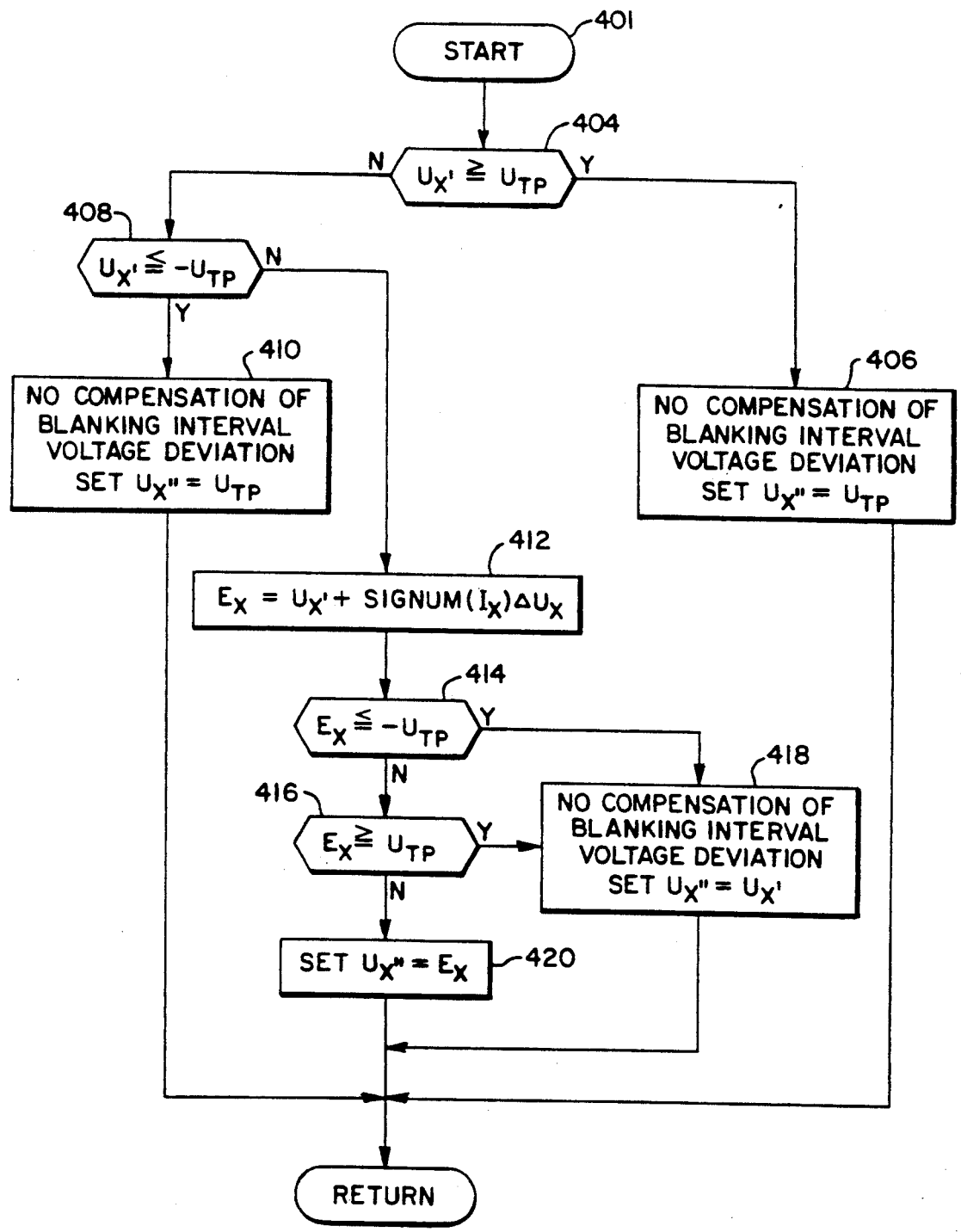
FIG. 4 shows a blanking interval voltage deviation compensation logic routine for compensating that loss.

FIG. 4 shows the logic routine for determining the value of the second augmented reference voltage signals ($U_A''$ and $U_B''$ and $U_C''$). For an inverter, voltage deviation in the inverter output is compensated. The routine of FIG. 4 provides that if the reference current $I_X$ (where X is A, B, or C and $I_A$ is associated with $U_A$, $I_B$ is associated with $U_B$, etc.) is positive, the blanking interval compensation voltage $\Delta U_X$ is extended to the first augmented reference voltage $U_X'$. On the other hand, if the reference current $I_X$ is negative, the same blanking interval compensation voltage $\Delta U_X$ is retracted from the first augmented reference voltage $U_X'$.

An inverter leg 56, 58, 60, is defined as the PWM circuit and the associated bridge leg. In FIG. 1 there are three inverter legs. Saturation of, for example, the inverter leg 56 occurs when an increase in input reference voltage to the PWM circuit does not yield any greater bridge output voltage. For example, an increase in $U_A'$ beyond $\pm UTP$ will not yield any greater inverter output voltage from that leg 56.

The routine compensates blanking interval voltage deviation if the inverter leg 56 is not saturated and compensation would not cause the inverter leg to saturate. Because PWM 3 saturates if $U_X'$ exceeds $\pm U_{TP}$, one can determine if the inverter leg is saturated by determining whether $U_X'$ is inside or outside $\pm U_{TP}$. One can also determine if compensation is going to cause saturation by determining whether $V_X$ is within $\pm U_{TP}$.

The routine is entered at step 401. If $U_X'$ is greater than or equal to the triangle peak $U_{TP}$ (a step 404 affirmative), inverter leg is saturated and therefore there is no compensation of a blanking interval voltage, and the input $U_X''$ to PWM 3 is set equal to $U_{TP}$ (a step 406). A similar result is generated if the first augmented reference voltage $U_X'$ is equal to or less than $-U_{TP}$ (a step 404 negative and step 408 affirmative); $U_X''$ is then set to $-U_{TP}$ (a step 410). If the step 408 is answered negative, the inverter leg 56 is not in saturation. From step 408 negative, the routine proceeds to step 412 where a sum $V_X$ is calculated between (a) $U_X'$ and (b) the blanking interval compensation voltage ($\Delta U_X = U_{DC}*[t\Delta/T_C]$) multiplied by the signum function of the reference current $I_X$. If the sum $V_X$ is less than or equal to $-U_{TP}$ (a step 414 affirmative), or greater than or equal to $U_{TP}$ (a step 414 negative and a step 416 affirmative), there is no compensation because doing so would put inverter leg into saturation; $U_X''$ is the same as $U_X'$ (a step 418). If the sum $V_X$ is within the bounds set by $U_{TP}$ and $-U_{TP}$ (a step 414 negative and a step 416 negative), compensating would not cause saturation; therefore the blanking interval voltage deviation is compensated by setting $U_X''$ to $V_X$ (a step 420). Because the signum function provides a value of 1 for a positive input and $-1$ for negative input, a voltage equal to the calculated voltage deviation is added to $U_X'$ if the reference current $I_X$ is greater than zero, and that voltage is subtracted from $U_X'$ if the reference current $I_X$ is less than zero.

The invention does not compensate blanking interval voltage deviation all the time, but only when it is necessary, for example, for a time equivalent to 240° of the reference phase voltage $U_X$. The invention may be implemented in an inverter circuit as in FIG. 1 or as a converter in FIG. 5. The balanced load elements 70 are replaced by inductors and three sinusoidal power sources $U_D$, $U_E$, and $U_F$.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method for compensating a voltage deviation in an output voltage of a pulse-width-modulation (PWM) inverter, said inverter including a bridge having three legs, said PWM using a carrier signal, a magnitude of the carrier signal having a positive peak and a negative peak, comprising the steps of:
   providing a plurality of reference current signals, each displaced by a phase angle from an adjacent reference current, one reference current associated with each leg;
   providing a plurality of first augmented reference voltage signals to a pulse-width modulation circuit, each first augmented reference voltage being associated with a single one of said reference current signals;
   calculating a blanking interval compensation voltage signal in response to a DC buss voltage of said inverter, a blanking interval, and a period of said carrier signal;
   adding the blanking interval voltage compensation signal to said first augmented reference voltage signals when said inverter is not saturated and said step of adding will not cause said inverter to saturate, thereby providing a second augmented reference signal.

2. A method for compensating a voltage deviation in the output voltage of a pulse-width-modulation (PWM) converter, said converter including a bridge having three legs, said PWM using a carrier signal, a magnitude of the carrier signal having a positive peak and a negative peak, comprising the steps of:
   providing a plurality of reference current signals, each displaced by a phase angle from an adjacent reference current, one reference current associated with each leg;
   providing a plurality of first augmented reference voltage signals to a pulse-width modulation circuit, each first augmented reference voltage being associated with a single one of said reference current signals;
   calculating a blanking interval compensation voltage signal in response to a DC buss voltage of said converter a blanking interval, and a period of said carrier signal;
   adding the blanking interval voltage compensation signals to said first augmented reference voltage signal when said converter is not saturated and said step of adding will not cause said converter to saturate, thereby providing a second augmented reference signal.

3. A device for compensating a voltage deviation in a output voltage of a pulse-width-modulation (PWM) inverter, said inverter including a bridge having three legs, said PWM using a carrier signal, a magnitude of the carrier signal having a positive peak and a negative peak, comprising:
   means for providing a plurality of reference current signals, each displaced by a phase angle from a adjacent reference current, one reference current associated with each leg;
   means for providing a plurality of first augmented reference voltage signals to a pulse-width modulation circuit, each first augmented reference voltage being associated with a single one of said reference current signals;
   means for calculating a blanking interval compensation voltage signal in response to a DC buss voltage of said inverter, a blanking interval, and a period of said carrier signal;
   means for providing a product of said blanking interval voltage deviation compensation signal and a polarity of the magnitude of one of said reference currents;
   means for summing said product with said one of said first augmented reference voltage signal and providing a sum;
   means for providing a second augmented reference voltage signal, including
   first means for comparing said positive peak to said first augmented reference voltage signal and providing said second augmented reference voltage signal at a value equal to the positive peak when said first augmented reference voltage signal is greater than said positive peak;
   second means for comparing said negative peak to said first augmented reference voltage signal and providing said second augmented reference voltage signal at a value equal to the negative peak when said first augmented reference voltage signal is less than said negative peak;
   third means for comparing said sum with said positive peak and providing said second augmented reference voltage signal at a value equal to a magnitude of said first augmented reference voltage signal when said positive peak is less than said sum;
   fourth means for comparing said sum with said negative peak and providing said second augmented reference voltage signal at a value equal to the magnitude of said first augmented reference voltage signal when said negative peak is less than said sum;
   means for providing said second augmented reference voltage signal at a value equal to said sum if said sum is neither greater than nor less than said positive and negative peaks.

4. A device for compensating a voltage deviation in the output voltage of a pulse-width-modulation (PWM) converter, said converter including a bridge having three legs, said PWM using a carrier signal, the magnitude of the carrier signal having a positive peak and a negative peak, comprising:
   means for providing a plurality of reference current signals, each displaced by a phase angle from the adjacent reference current, one reference current associated with each leg;
   means for providing a plurality of first augmented reference voltage signals to a pulse-width modulation circuit, each first augmented reference voltage being associated with a single one of said reference current signals;
   means for calculating a blanking interval compensation voltage signal in response to a DC buss voltage of said converter, a blanking interval, and a period of said carrier signal;
   means for providing a product of said blanking interval voltage deviation compensation signal and a polarity of the magnitude of one of said reference currents;
   means for summing said product with said first augmented reference voltage signal and providing a sum;
   means for providing a second augmented reference voltage signal, including first means for comparing said positive peak to said first augmented reference voltage signal and providing said second augmented reference voltage signal at a value equal to the positive peak when said first augmented reference voltage signal is greater than said positive peak;

second means for comparing said negative peak to said first augmented reference voltage signal and providing said second augmented reference voltage signal at a value equal to the negative peak when said first augmented reference voltage signal is less than said negative peak;

third means for comparing said sum with said positive peak and providing said second augmented reference voltage signal at a value equal to a magnitude of said first augmented reference voltage signal when said positive peak is less than said sum;

fourth means for comparing said sum with said negative peak and providing said second augmented reference voltage signal at a value equal to the magnitude of said first augmented reference voltage signal when said negative peak is less than said sum;

means for providing said second augmented reference voltage signal at a value equal to said sum if said sum is neither greater than nor less than said positive and negative peaks.

5. The method of claim 1, wherein the step of adding the blanking interval voltage compensation signal includes the steps of:

providing the product of said blanking interval voltage compensation signal and a polarity of a magnitude of one of said reference currents;

summing said product with one of said first augmented reference voltage signals and providing a sum; and providing a second augmented reference voltage signal, including comparing said positive peak to said first augmented reference voltage signal and providing said second augmented reference voltage signal at a value equal to the positive peak when said first augmented reference voltage signal is greater than said positive peak;

comparing said negative peak to said first augmented reference voltage signal and providing said second augmented reference voltage signal at a value equal to the negative peak when said first augmented reference signal is less than said negative peak;

comparing said sum with said positive peak and providing said second augmented reference voltage signal at a value equal to the magnitude of said first augmented reference voltage signal when said positive peak is less than said sum;

comparing said sum with said negative peak and providing said second augmented reference voltage signal at a value equal to the magnitude of said first augmented reference voltage signal when said negative peak is less than said sum; and providing said second augmented reference voltage signal at a value equal to said sum if said sum is neither greater than nor less than said positive and negative peaks.

6. The method of claim 2, wherein said step of adding the blanking interval voltage compensation signal includes the steps of:

providing the product of said blanking interval voltage compensation signal and a polarity of the magnitude of one of said reference currents;

summing said product with said first augmented reference voltage signal and providing a sum; and providing a second augmented reference voltage signal, including:

comparing said positive peak to said first augmented reference voltage signal and providing said second augmented reference voltage signal at a value equal to said positive peak when said first augmented reference voltage signal is greater than said positive peak;

comparing said negative peak to aid first augmented reference voltage signal and providing said second augmented reference voltage signal at a value equal to said negative peak when said first augmented reference voltage signal is less than said negative peak;

comparing said sum with said positive peak and providing said second augmented reference voltage signal at a value equal to the magnitude of said first augmented reference voltage signal when said positive peak is less than said sum;

comparing said sum with said negative peak and providing said second augmented reference voltage signal at a value equal to the magnitude of said first augmented reference voltage signal when said negative peak is less than said sum; and providing said second augmented reference voltage signal at a value equal to said sum if said sum is neither greater than nor less than said positive or negative peaks.

* * * * *